(12) United States Patent
Takahashi et al.

(10) Patent No.: US 6,628,035 B2
(45) Date of Patent: Sep. 30, 2003

(54) ALTERNATOR

(75) Inventors: Tomoki Takahashi, Tokyo (JP); Hideki Morikaku, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/993,623

(22) Filed: Nov. 27, 2001

(65) Prior Publication Data

US 2002/0105242 A1 Aug. 8, 2002

(30) Foreign Application Priority Data

Feb. 6, 2001 (JP) .......................... 2001-029718

(51) Int. Cl.⁷ .............................................. H02K 39/38
(52) U.S. Cl. ........................................................ 310/239
(58) Field of Search ........................... 310/89, 263, 239, 310/249, 241, 242, 91

(56) References Cited

U.S. PATENT DOCUMENTS

| 3,603,824 | A | * | 9/1971 | Csaki ........................ 310/239 |
| 5,955,810 | A | * | 9/1999 | Umeda et al. .............. 310/201 |
| 6,081,054 | A | * | 6/2000 | Kashihara et al. ........... 310/58 |
| 6,356,003 | B1 | * | 3/2002 | Fiorenza et al. ............ 310/179 |

FOREIGN PATENT DOCUMENTS

| JP | 51-66409 | 6/1976 | ........... H01R/38/38 |
| JP | 51-87205 | 7/1976 | ........... H01R/39/40 |

* cited by examiner

Primary Examiner—Dang Le
Assistant Examiner—Nguyen Hanh
(74) Attorney, Agent, or Firm—Sughrue Mion, PLLC

(57) ABSTRACT

An alternator comprises a brush holding assembly holding brushes within a holding portion and being provided with a cover capable of being opened to remove the brush; and a cap which is disposed on an open portion for removal and insertion of the brush, the open portion being formed at a position on the case facing the cover. The removal and insertion of the brush is performed through the open portion with the open portion opened.

9 Claims, 20 Drawing Sheets

FIG. 5A
FIG. 5B
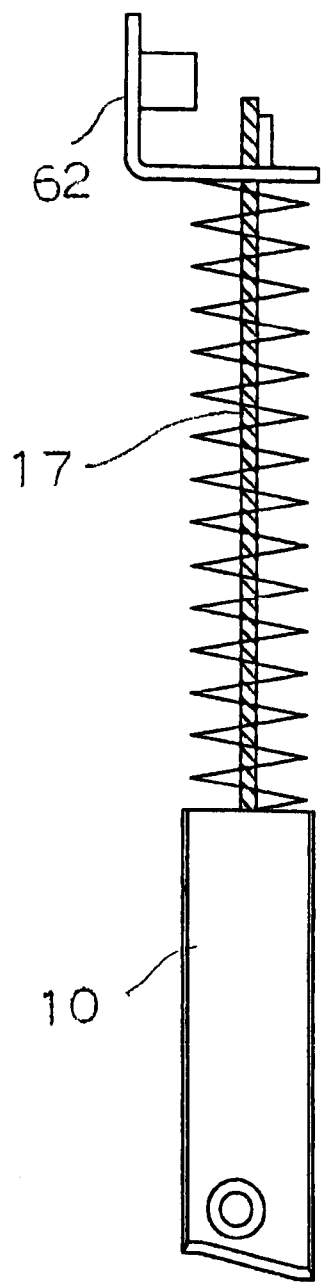
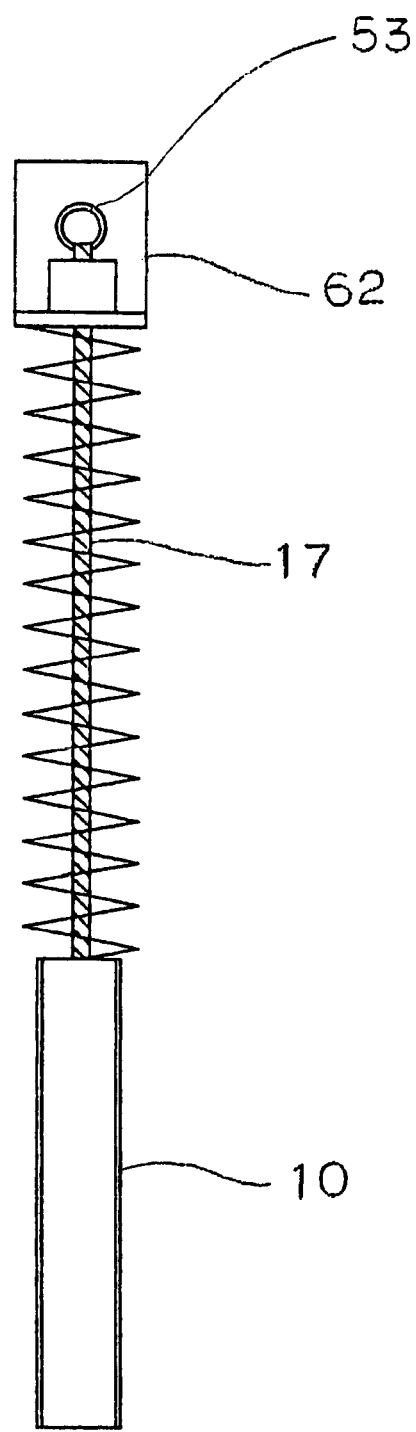

ALTERNATOR

BACKGROUND OF THE INVENTION

1. Field of the Invention

The present invention relates to an alternator used in an automotive alternator driven by an internal combustion engine, for example.

2. Description of the Related Art

FIG. 20 is a cross section of a conventional automotive alternator, FIG. 21 is a view of the internals at a rear bracket end of the automotive alternator in FIG. 20, FIG. 22 is a perspective of a rotor of the alternator in FIG. 20, and FIG. 23 is a perspective of a stator of the alternator in FIG. 20.

This alternator includes: a case 3 composed of an aluminum front bracket 1 and an aluminum rear bracket 2; a shaft 6 disposed inside the case 3, a pulley 4 being secured to a first end of the shaft 6; a Lundell-type rotor 7 secured to the shaft 6; first and second fans 5a and 5b secured to first and second end surfaces of the rotor 7; a stator 8 secured to an inner wall within the case 3; slip rings 9 secured to a second end of the shaft 6 for supplying electric current to the rotor 7; a pair of brushes 10 which slide on surfaces of the slip rings 9; wires 17 each having an end portion connected to these brushes 10; springs 16 for pressing the brushes 10 toward the slip rings 9; a brush holding assembly 100 having a holding portion 11a for housing the brushes 10 and a cover 11b removably disposed on a head portion of the holding portion 11a; a rectifier 12 which is electrically connected to the stator 8 for converting alternating current generated in the stator 8 into direct current; a regulator 13 secured to the brush holding assembly 100 for adjusting the magnitude of an alternating voltage generated in the stator 8; and a cooling plate 14 placed in contact with and secured to the regulator 13 to dissipate and cool heat generated in the regulator 13.

The rotor 7 includes: a rotor coil 18 for generating magnetic flux on passage of electric current; and a pole core 19 disposed so as to cover the rotor coil 18, magnetic poles being formed in the pole core 19 by the magnetic flux. The pole core 19 is constituted by a first pole core portion 20 and a second pole core portion 21 which intermesh with each other. The first pole core portion 20 is made of iron and has tapered first claw-shaped magnetic poles 22 extending axially. The second pole core portion 21 is made of iron and has tapered second claw-shaped magnetic poles 23 extending axially in an opposite direction to the first claw-shaped magnetic poles 22.

The stator 8 is constituted by: a stator core 24 for passage of a rotating magnetic field from the rotor coil 18, the stator core being formed by laminating a plurality of steel plates together; and three stator winding phase portions 25 through each of which an output current flows. The stator core 24 is constituted by an annular core back 26, and a plurality of teeth 27 extending radially inwards from the core back 26 at an even pitch in a circumferential direction. The stator winding phase portions 25, formed by winding an enamel-coated conducting wire for a plurality of winds, are housed in a total of thirty-six slots 28 formed between adjacent pairs of the teeth 27.

In an automotive alternator of the above construction, electric current is supplied from a battery (not shown), which is an electric power supply, through the brushes 10 and the slip rings 9 to the rotor coil 18, generating magnetic flux and giving rise to a magnetic field. At the same time, since the pulley 4 is driven by the engine and the rotor 7 is rotated by the shaft 6, a rotating magnetic field is applied to the stator core 24, generating electromotive force in the stator winding phase portions 25 and an output current is generated by an external load connected to the automotive alternator.

Moreover, after the commencement of power generation, the alternator is switched over to self-excitation, in which a portion of the electric current output from the alternator, rather than from the battery, is supplied through the brushes 10 to the rotor coil 18.

In an automotive alternator of the above construction, one problem has been that the brush holding assembly 100 is housed in the sealed case 3, and when replacing expended brushes 10, for example, the automotive alternator must first be disassembled and the brush holding assembly 100 removed from the case 3. Then the operation of replacing the brushes 10 is performed, and after that, the brush holding assembly 100 must be installed in the case 3 and the automotive alternator reassembled.

SUMMARY OF THE INVENTION

The present invention aims to solve the above problem and an object of the present invention is to provide an alternator that facilitates the operation of replacing the brushes, which alternator has improved cooling efficiency and a small size.

In order to achieve the above object, according to one aspect of the present invention, there is provided an alternator including:

a case;

a shaft passing through the case;

a rotor secured to the shaft, the rotor including a rotor coil for generating a magnetic flux on passage of an electric current therethrough, and a plurality of claw-shaped magnetic poles extending in an axial direction and covering said rotor coil, the claw-shaped magnetic poles being magnetized into North-seeking (N) and South-seeking (S) poles by the magnetic flux;

a stator including a stator core provided with a plurality of slots formed so as to extend axially and be spaced circumferentially, and a stator winding mounted to the stator core;

slip rings secured to the shaft;

brushes the end of which slide on the slip rings, supplying electric current to the rotor coil through the slip rings from an electric power supply;

a brush holding assembly which the shaft passes through, the brush holding assembly holding the brushes within a holding portion and provided with a cover capable of being opened to remove the brushes; and a cap for closing an open portion for removal and insertion of the brushes, the open portion being formed at a position on the case facing the cover.

The brush holding assembly may extend to a vicinity of the open portion.

A regulator for adjusting the magnitude of an alternating voltage generated in the stator and a cooling plate placed in contact with the regulator may be disposed on the brush holding assembly so as to overlap each other on the non-rotor side of the brush holding assembly.

The cooling plate may be provided with plural cooling fins extending in a radial direction of the rotor.

A partition wall for making the cooling air passing through the cooling plate take a circuitous route toward the brush may be provided.

The partition wall may be formed so as to be integral with the cap.

A cooling fan to generate forced convection in the case may be provided between the rotor and the brush holding assembly.

A conducting wire of the stator winding may extend outwards in an axial direction from an end surface of the stator core and be formed into coil ends having a uniform shape in a circumferential direction.

BRIEF DESCRIPTION OF THE DRAWINGS

FIGS. 5A and 5B are a view of a brush and a brush terminal in FIG. 1;

DETAILED DESCRIPTION OF THE PREFERRED EMBODIMENTS

The preferred embodiments of the present invention will now be explained, and members or portions the same as or corresponding to those in the conventional example will be given the same numbering.

Embodiment 1

Figure 1:
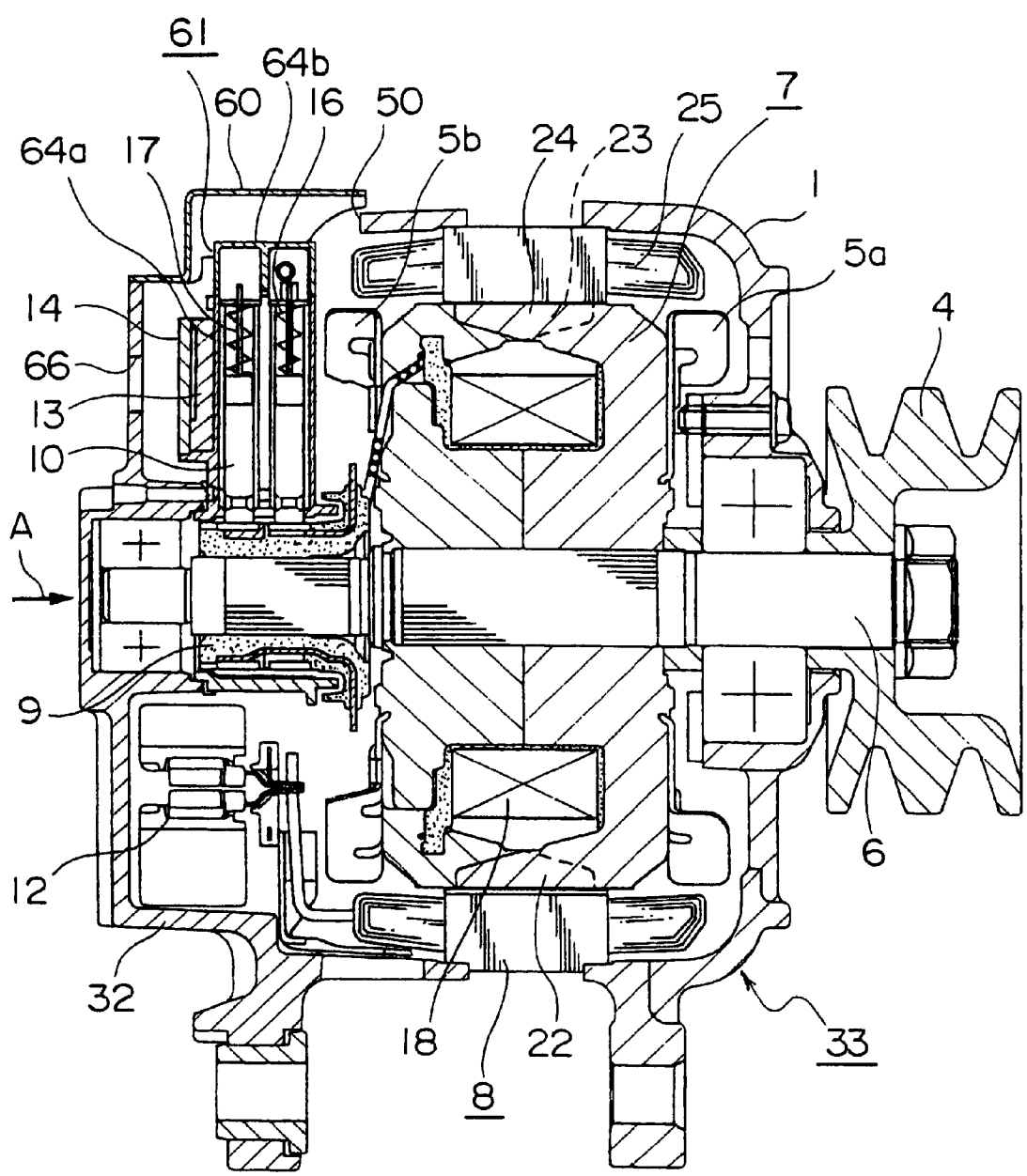
FIG. 1 is a cross section of an automotive alternator according to Embodiment 1 of the present invention.
Figure 2:
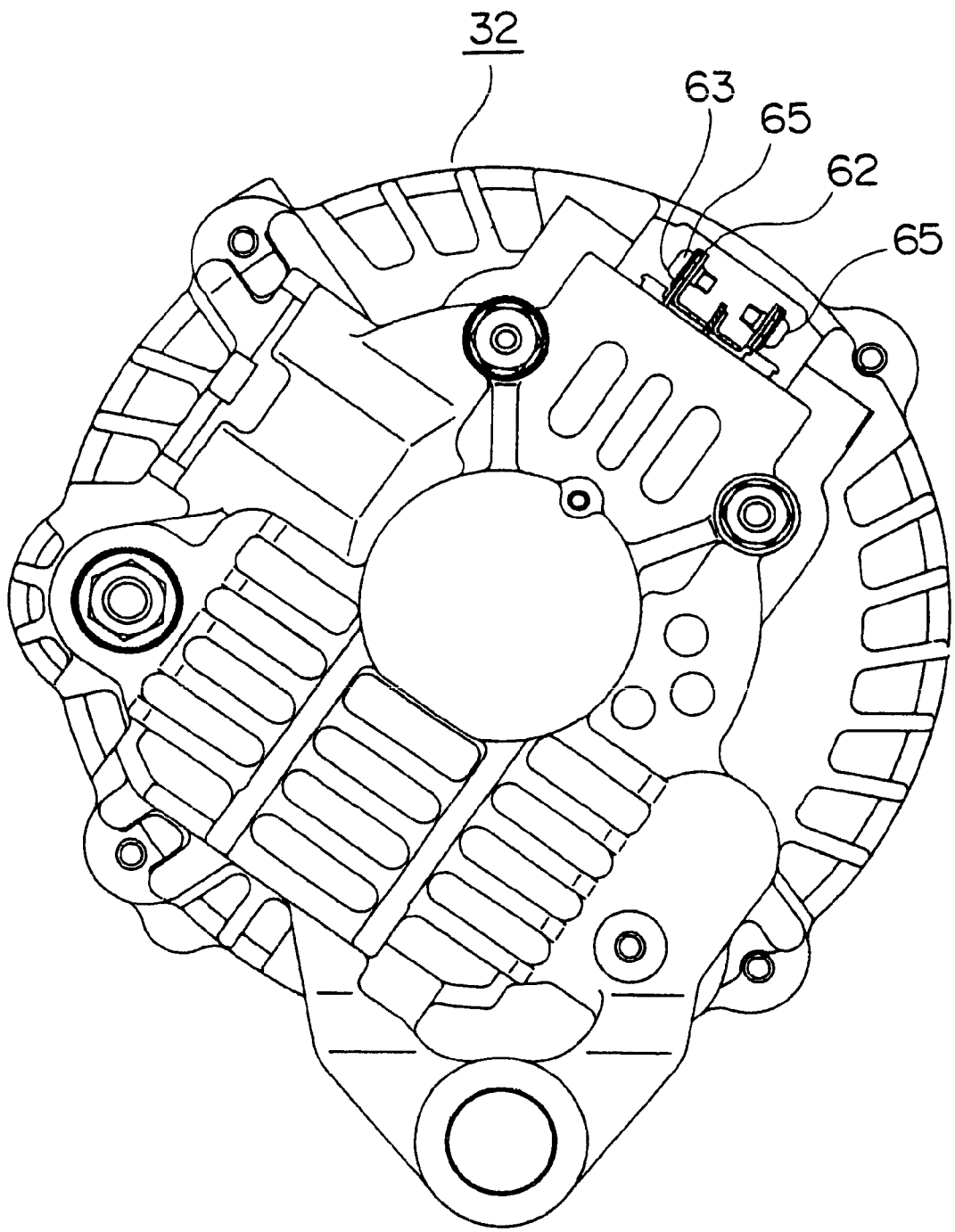
FIG. 2 is a view of the automotive alternator in FIG. 1 from the direction of an arrow A.
Figure 3:
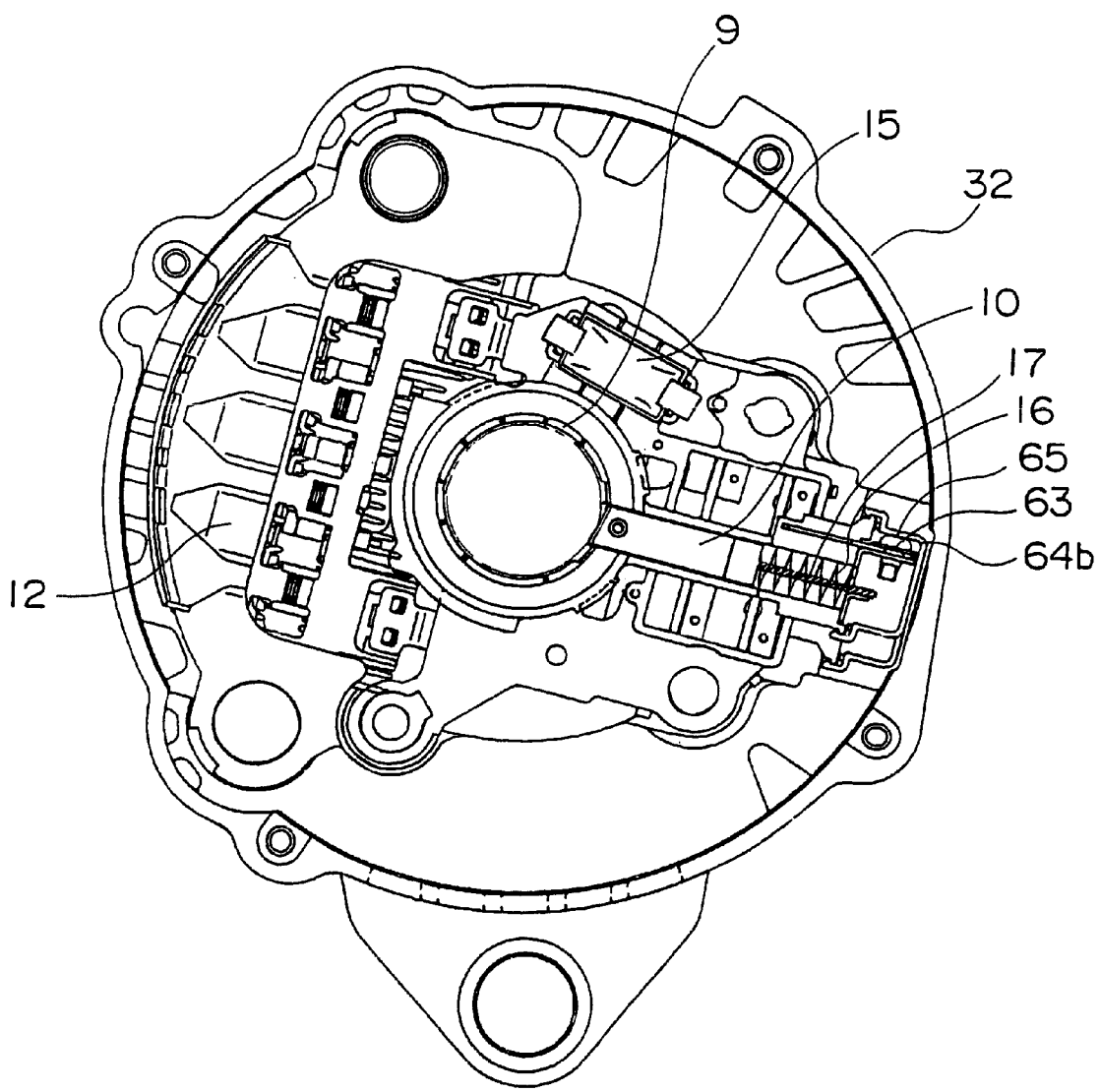
FIG. 3 is a view of a rear bracket end of inside of the automotive alternator in FIG. 1.
Figure 4A:
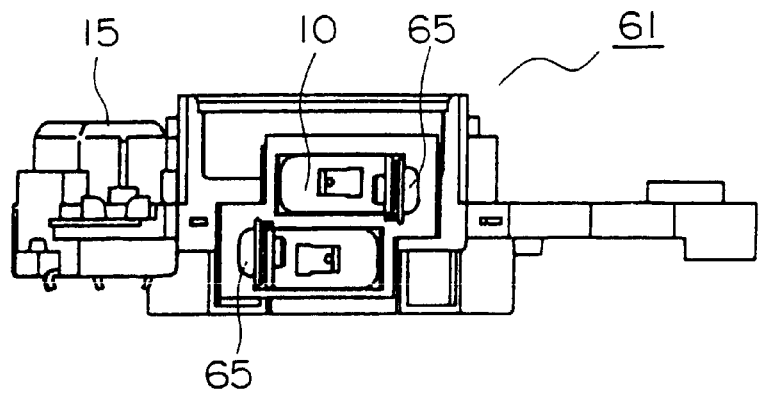
FIG. 4A is a plan view of a brush holding assembly of the automotive alternator in FIG. 1 with a cover removed.
Figure 4B:
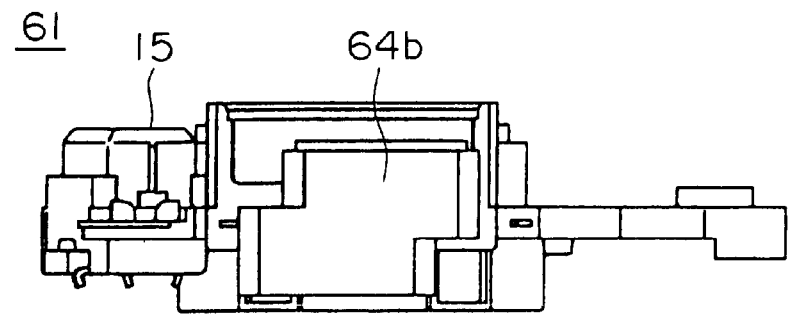
FIG. 4B is a plan view of the brush holding assembly of the automotive alternator in FIG. 1.
Figure 4C:
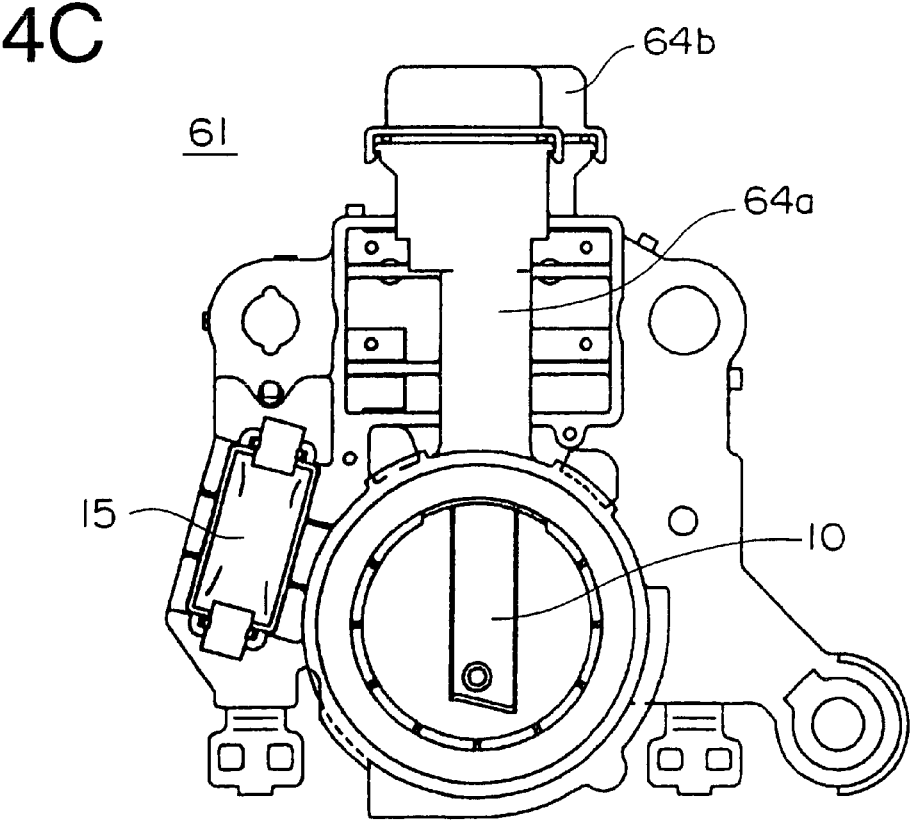
FIG. 4C is a front elevation of the brush holding assembly of the automotive alternator in FIG. 1.

FIG. 1 is a cross section of an automotive alternator according to Embodiment 1 of the present invention, FIG. 2 is a view of the automotive alternator in FIG. 1 from the direction of the arrow, FIG. 3 is a view of a rear bracket end of the automotive alternator in FIG. 1, FIG. 4A is a plan view of a brush holding assembly 61 of the automotive alternator in FIG. 1 with a cover 64b removed, FIG. 4B is a plan view of a brush holding assembly 61, FIG. 4C is a front elevation of the brush holding assembly 61.

This alternator includes: a case 33 composed of an aluminum front bracket 1 and an aluminum rear bracket 32; a shaft 6 disposed inside the case 33, a pulley 4 being secured to a first end of the shaft 6; a Lundell-type rotor 7 secured to the shaft 6; fans 5a, 5b rotatable with rotor 7; a stator 8 secured to an inner wall within the case 33; slip rings 9 secured to a second end of the shaft 6 for supplying electric current to the rotor 7; a pair of brushes 10 which slide on surfaces of the slip rings 9; wires 17 each having an end portion connected to these brushes 10; spring 16 for pressing the brushes 10 toward the slip rings 9; a brush holding assembly 61 having a holding portion 64a for housing the brushes 10 and a cover 64b removably disposed on a head portion of the holding portion 64a; a rectifier 12 which is electrically connected to the stator 8 for converting alternating current generated in the stator 8 into direct current; a regulator 13 secured to the brush holding assembly 61 for adjusting the magnitude of a an alternating voltage generated in the stator 8; and a cooling plate 14 placed in contact with a secured to the regulator 13 to dissipate and cool heat generated in the regulator 13.

The brush holding assembly 61 having the holding portion 64a and the cover 64b is constructed such that terminals electrically connected to a battery, which is a power supply, are formed integrally therewith in a resin molding. An open portion 50 is formed in a position on the case 33 facing the cover 64b of the brush holding assembly 61.

As shown in FIGS. 5A, 5B, brush terminals 62 secured to terminals of the brush holding assembly 61 by screws which are connection members passing through screw apertures 53 are mounted to the wires 17 extending from the brushes 10.

Figure 6:
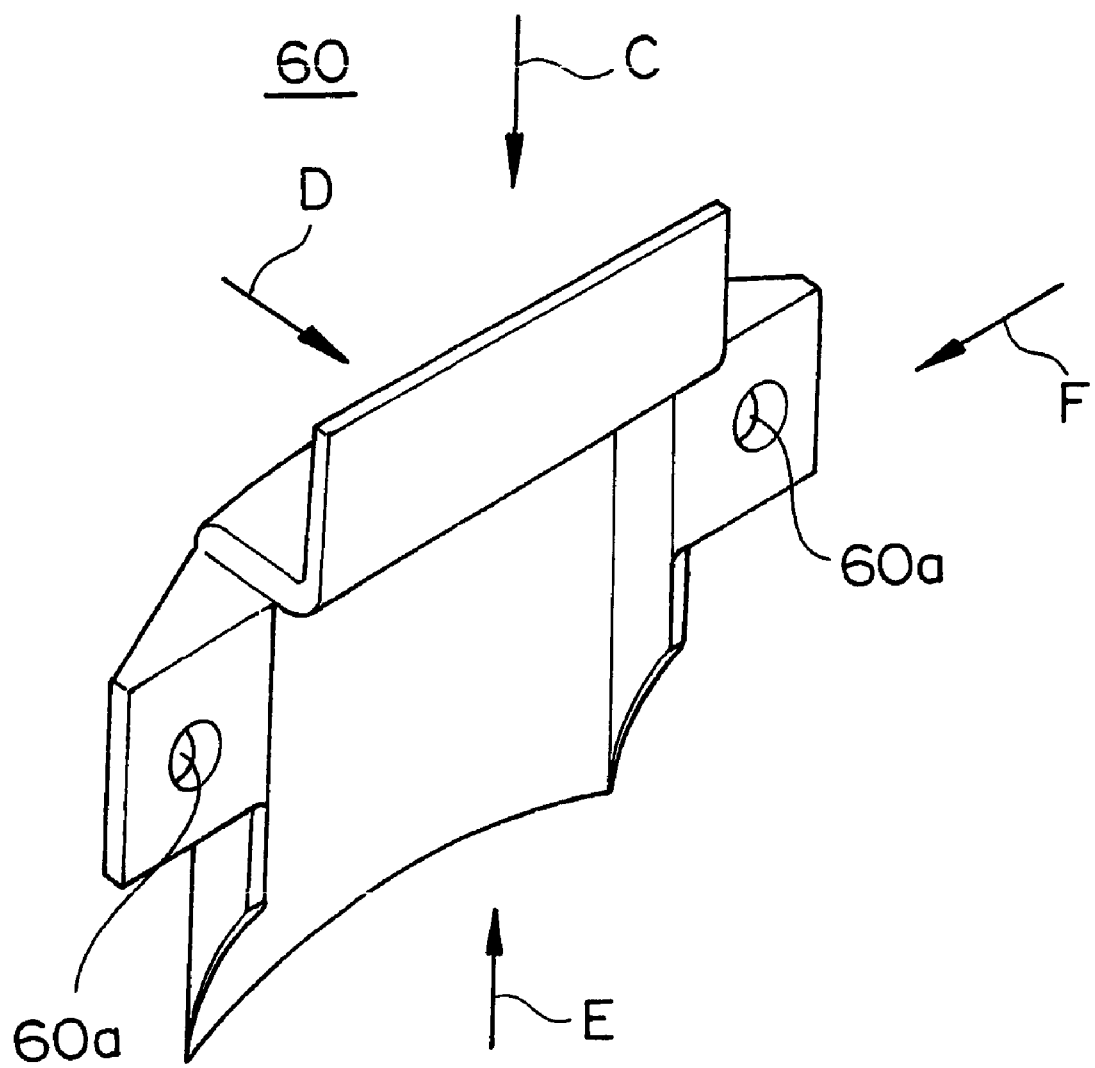
FIG. 6 is a perspective of a cap in FIG. 1.
Figure 7A:
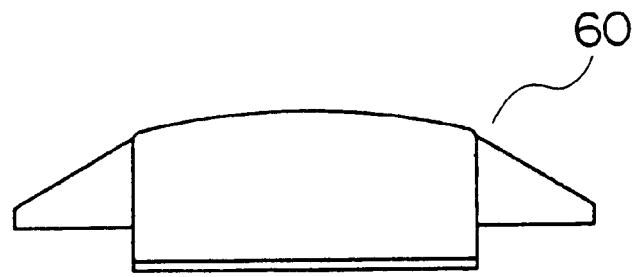
FIG. 7A is a view of the cap from the direction of an arrow C in FIG. 6.
Figure 7D:
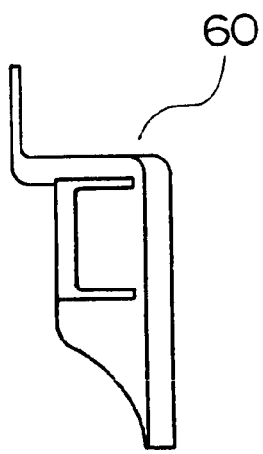
FIG. 7D is a view of the cap from the direction of an arrow F in FIG. 6.
Figure 7B:
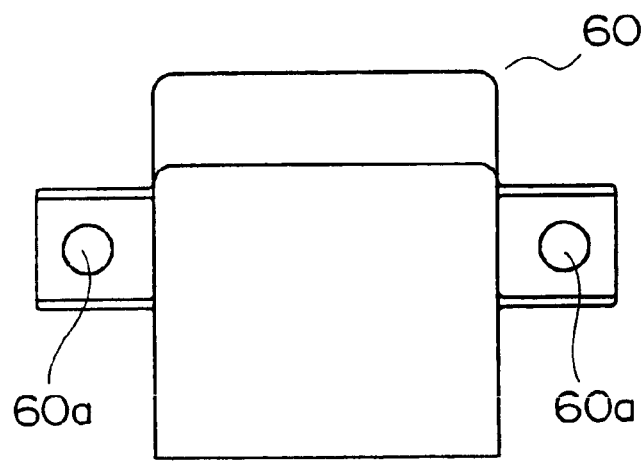
FIG. 7B is a view of the cap from the direction of an arrow D in FIG. 6.
Figure 7C:
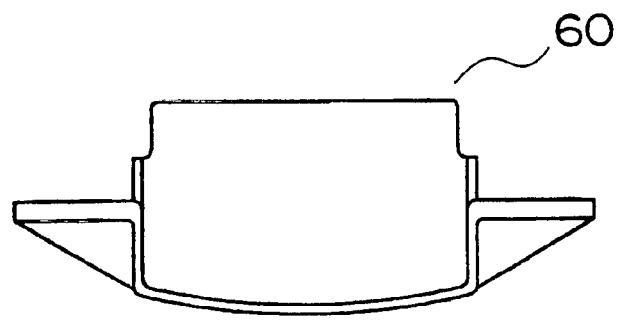
FIG. 7C is a view of the cap from the direction of an arrow E in FIG. 6.

The cap 60, shown in FIGS. 6 and 7, is mounted over the open portion 50 formed in the rear bracket 32. Holding assembly terminals 63 of the brush holding assembly 61 are exposed at the open portion 50, and the brush terminals 62 are secured to the holding assembly terminals 63 by a pair of screws 65. Tip portions of the pair of screws 65 are oriented in a circumferential direction. The radial dimension of a holding portion 64a of the brush holding assembly 61 extends to a vicinity of the open portion 50 of the rear bracket 32, as can be seen from FIG. 1. Furthermore, first and second fans 5a and 5b are secured to first and second end surfaces of the rotor 7.

The rotor 7 includes: a rotor coil 18 for generating magnetic flux on passage of an electric current therethrough; and a pole core 19 disposed so as to cover the rotor coil 18, magnetic poles being formed in the pole core 19 by the magnetic flux. The pole core 19 is constituted by a first pole core portion 20 and a second pole core portion 21 which intermesh with each other. The first pole core portion 20 is made of iron and has tapered first claw-shaped magnetic poles 22 extending axially. The second pole core portion 21 is made of iron and has tapered second claw-shaped magnetic poles 23 extending in a direction axially opposite to the first claw-shaped magnetic poles 22.

The stator 8 is constituted by: a stator core 24 for passage of a rotating magnetic field from the rotor coil 18, the stator core 24 being formed by laminating a plurality of steel plates together; and three stator winding phase portions 25 through each of which an output current flows. The stator core 24 is constituted by an annular core back 26, and a plurality of teeth 27 extending radially inwards from the core back 26 at an even pitch in a circumferential direction. The stator winding phase portions 25, formed by winding an enamel-coated conducting wire for a plurality of winds, are housed in a total of thirty-six slots 28 formed between adjacent pairs of the teeth 27.

In an automotive alternator of the above construction, electric current is supplied from the battery through the brushes 10 and the slip rings 9 to the rotor coil 18, generating magnetic flux and giving rise to a magnetic field. At the same time, since the pulley 4 is driven by an engine and the rotor 7 is rotated by the shaft 6, a rotating magnetic field is applied to the stator core 24, generating electromotive force in the stator winding phase portions 25 and an output current is generated by an external load connected to the automotive alternator.

In the automotive alternator of the above construction, because the open portion 50 is formed in the position on the case 33 facing the cover 64b of the brush holding assembly 61, replacement of the brushes 10 may be performed simply by removing the cover 64b and the screws secured in the screw apertures 53 from the brush holding assembly 61, and there is no necessity to go to the trouble of disassembling the alternator. Also, because a connection portion connecting the holding assembly terminals 63 of the brush holding assembly 61 and the brush terminals 62 is disposed in the open portion 50, whereby the open portion 50 forms a space for the connection operation, therefore, connection of the holding assembly terminals 63 and the brush terminals 62 can be performed easily.

Further, because the cap 60 is secured over the open portion 50, foreign matter, water, etc. are prevented from entering the case 33.

Furthermore, because the brush terminals 62 are secured by the screws 65 to the holding assembly terminals 63 of the brush holding assembly 61 which are exposed at the open portion 50, electrical connection of the holding assembly terminals 63 and the brushes 10 is simple, and the operation of replacing the brushes 10 is improved.

Furthermore, because the tip portions of the pair of screws 65 are oriented in the circumferential direction, a removal tool can be used from the circumferential direction and the extent of movement of the tool will not greatly exceed the axial bounds of the case 33, making the construction ideal for the operation of replacing the brushes 10 in an internal combustion engine in which parts are densely clustered in an axial direction relative to the shaft 6.

Further, because the radial dimension of the brush holding assembly 61 extends to the vicinity of the rear bracket 32, the longitudinal dimension of the brushes 10 can be lengthened proportionately, enabling the brushes 10 to be used over a long period without replacement. Furthermore, because clearance between the rear bracket 32 and the brush holding assembly 61 is small and the cap 60 is provided, a large proportion of air which has entered the case 33 through a ventilation aperture 66 takes a circuitous route and flows toward the regulator 13 and the brushes 10, and the flow of the air is smoothed by the cap 60, improving cooling of the regulator 13 and the brushes 10.

Furthermore, because the regulator 13 and the cooling plate 14 which is in contact with the regulator 13 are disposed on the brush holding assembly 61 so as to overlap the rotor 7 in an axial direction, the construction is compact, and because a centrifugal flow is efficiently generated by the brushes 10 which are provided radially relative to the rotor 7, cooling of the regulator 13 is improved. Furthermore, because the brush holding assembly 61 is secured to the rear bracket 2 after the regulator 13 has been secured to the brush holding assembly 61, the brush holding assembly 61 is not obstructed by the regulator 13 when mounting the brush holding assembly 61 to the rear bracket 32.

Embodiment 2

Figure 8:
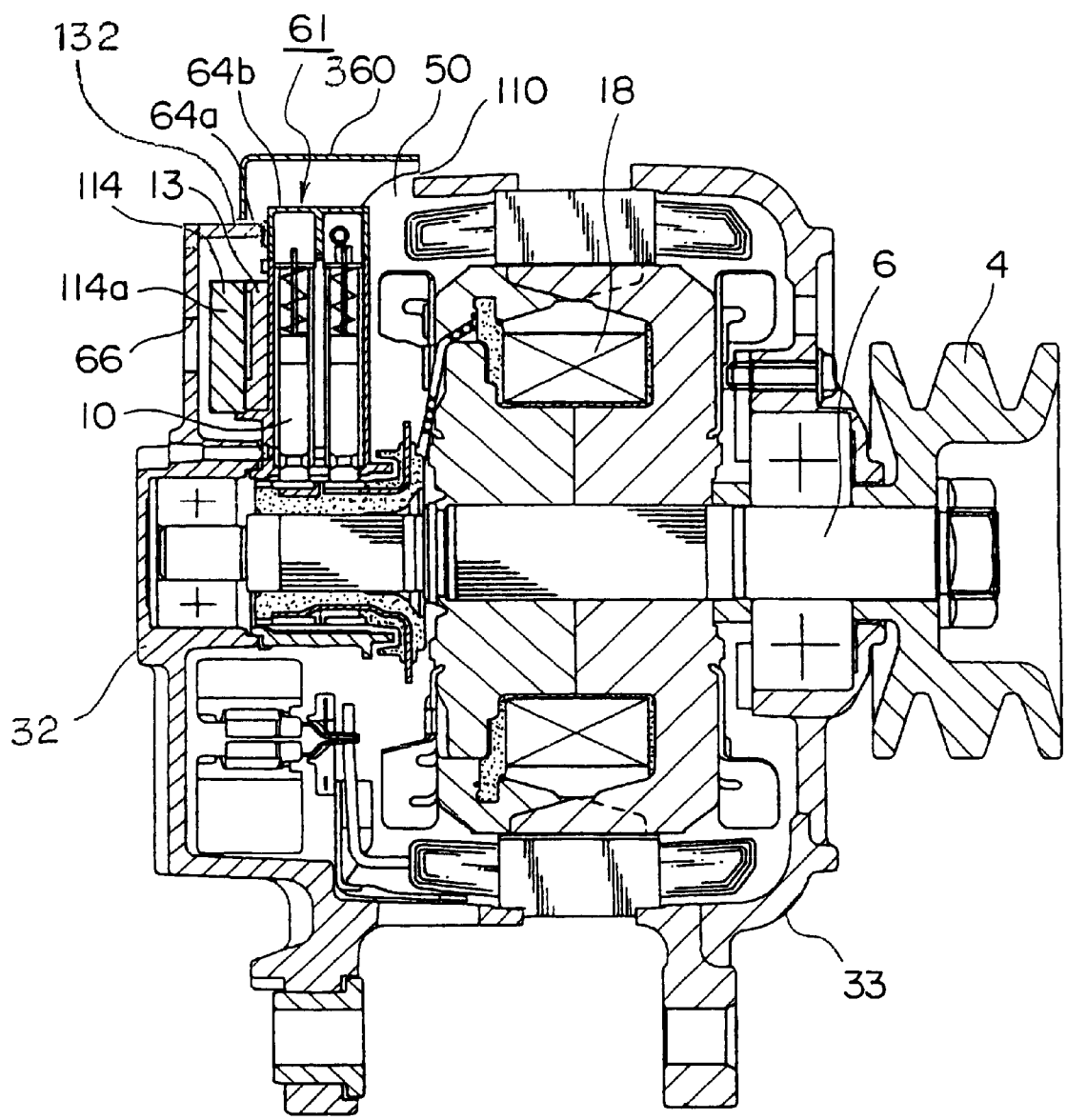
FIG. 8 is a cross section of an automotive alternator according to Embodiment 2 of the present invention.
Figure 9:
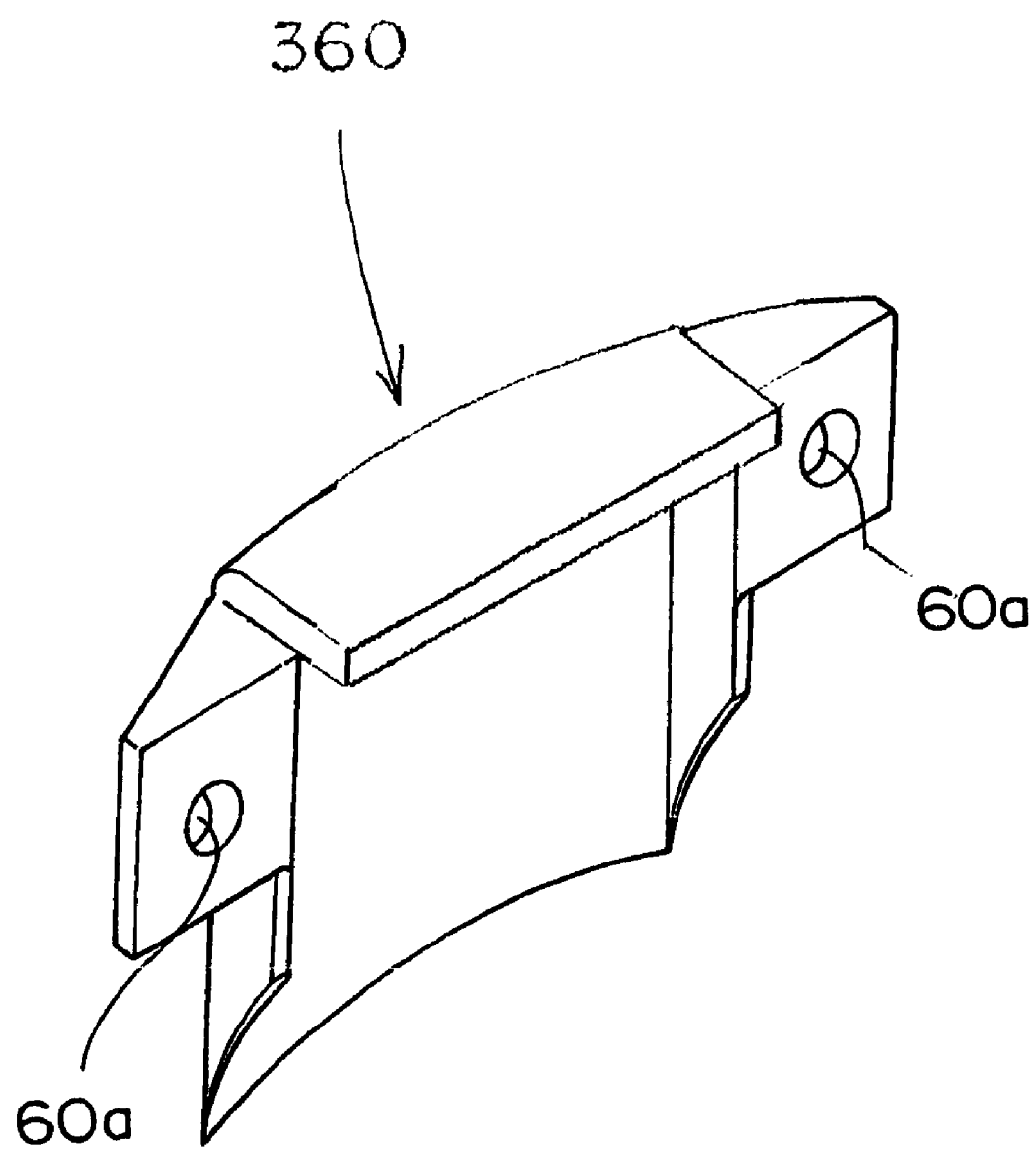
FIG. 9 is a perspective of a cap in FIG. 8.

FIG. 8 is a cross section of an automotive alternator according to Embodiment 2 of the present invention, and FIG. 9 is a perspective of a cap 360 in FIG. 8.

Figure 10:
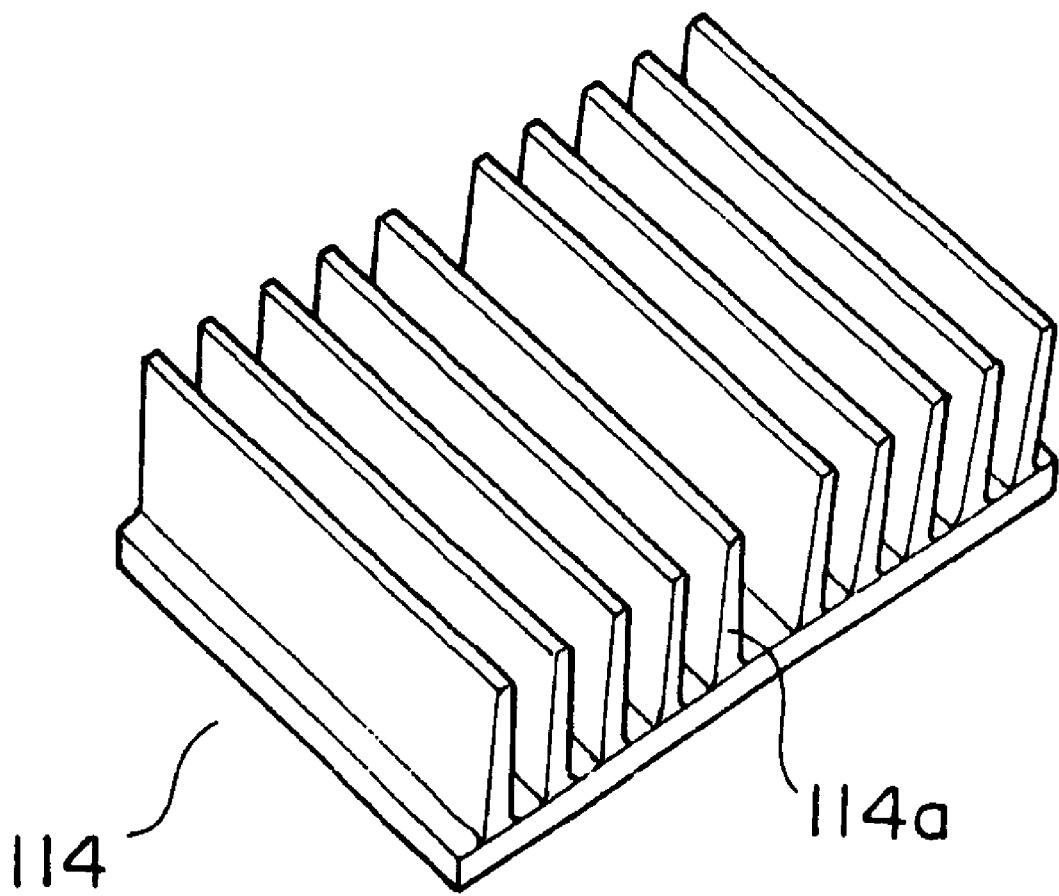
FIG. 10 is a perspective of a cooling plate in FIG. 8.

In this Embodiment 2, a partition wall 132 is mounted on the rear bracket 32 for the cooling air through a cooling plate 114 toward the brushes 10 to takes a circuitous route. Further, the cooling plate 114 is provided with plural cooling fins 114a extending in a radial direction of the rotor 7 as shown in FIG. 10.

Except for the above construction, the automotive alternator according to Embodiment 2 has a similar construction to that of the automotive alternator according to Embodiment 1.

In the automotive alternator of the above construction, because a partition wall 132 is mounted on the rear bracket 32 extending in an axial direction thereof, air which has entered the case 33 through the ventilation aperture 66 does not directly flow outside through a ventilation aperture 110 of the cap 360, but takes a circuitous route toward the regulator 13 and the brushes 10, and flows outside, improving cooling of the regulator 13 and the brushes 10. Further, because the cooling plate 114 has plural cooling fins 114a extending in the radial direction of the rotor 7, the contact area of the air and the cooling plate 114 increases, and the cooling plate 114 is disposed so as to overlap the brushes 10 extending in the radial direction in an axial direction, the cooling air flows more smoothly in the radial direction, further improving cooling of the regulator 13.

Embodiment 3

Figure 11:
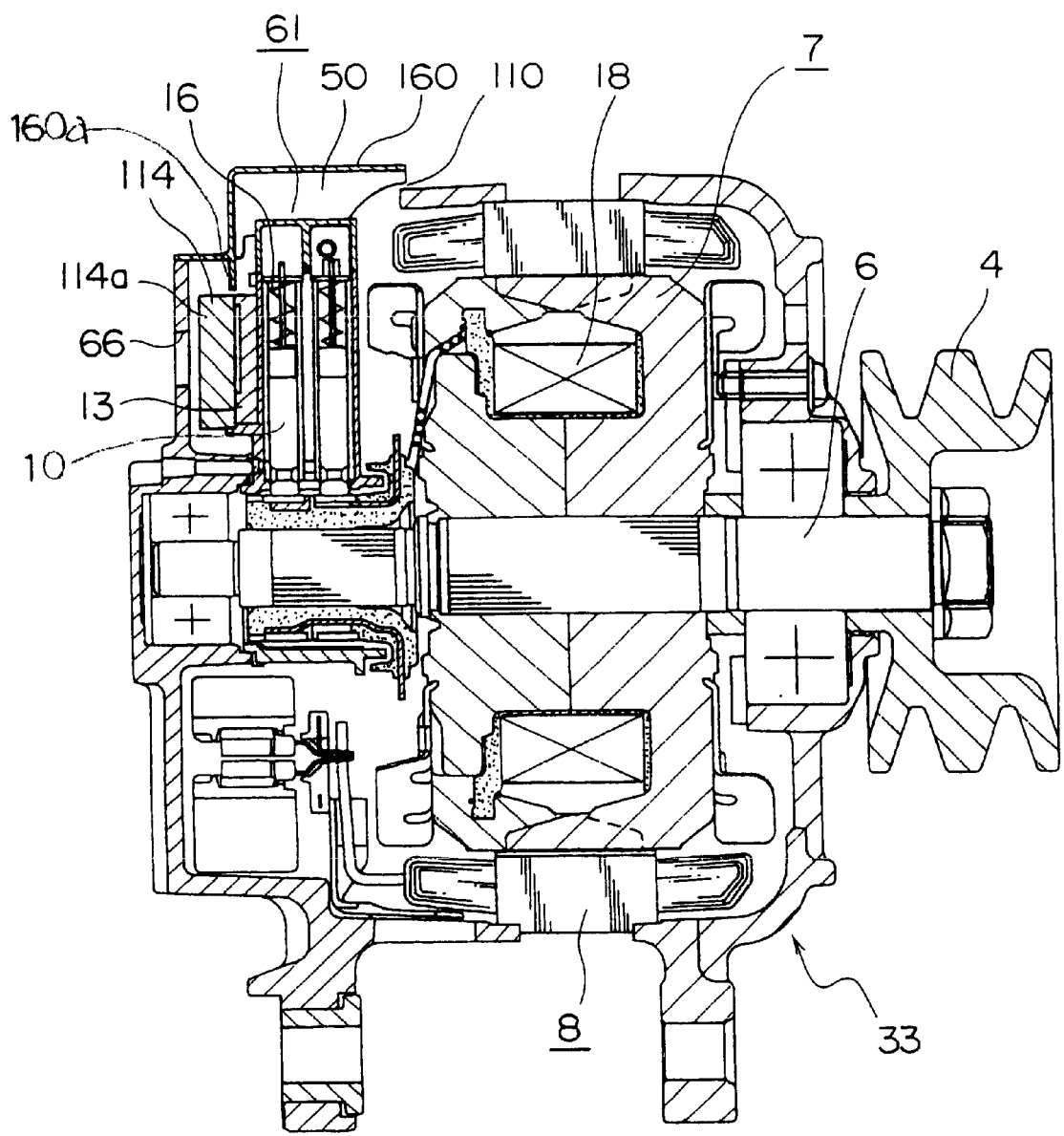
FIG. 11 is a cross section of an automotive alternator according to Embodiment 3.
Figure 12:
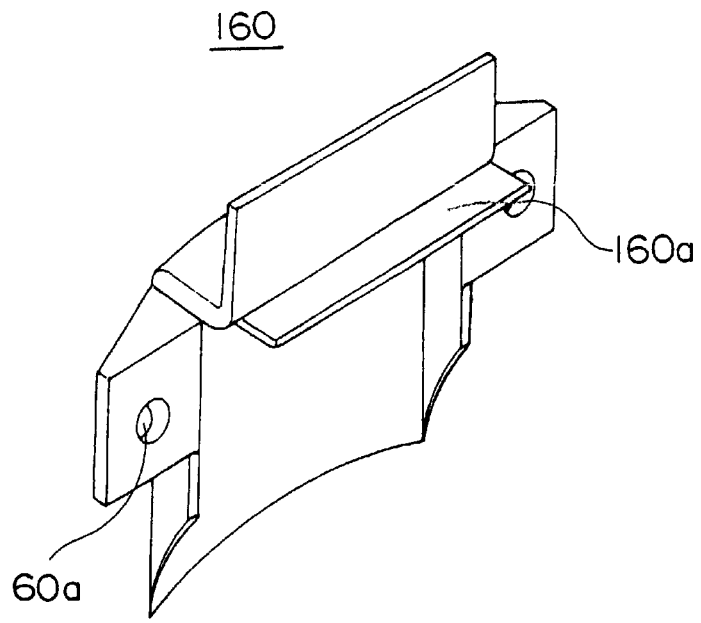
FIG. 12 is a perspective of a cap in FIG. 11.

FIG. 11 is a cross section of an automotive alternator according to Embodiment 3 of the present invention, and FIG. 12 is a perspective of a cap 160 in FIG. 11.

In this Embodiment 3, a cap 160 made of resin has a partition wall 160a which makes air that has entered the case 33 through the ventilation aperture 66 take a circuitous route toward the regulator 13 and the brushes 10.

Except for the above construction, the automotive alternator according to Embodiment 3 has a similar construction to that of the automotive alternator according to Embodiment 2.

In the automotive alternator of the above construction, because the partition wall 160a can be simultaneously formed as a resin molding of the cap 160, and the creepage distance for insulation between the cooling plate 114 and area around the brushes 10 which have an electric potential difference therebetween can be increased, insulation is improved.

Figure 13:
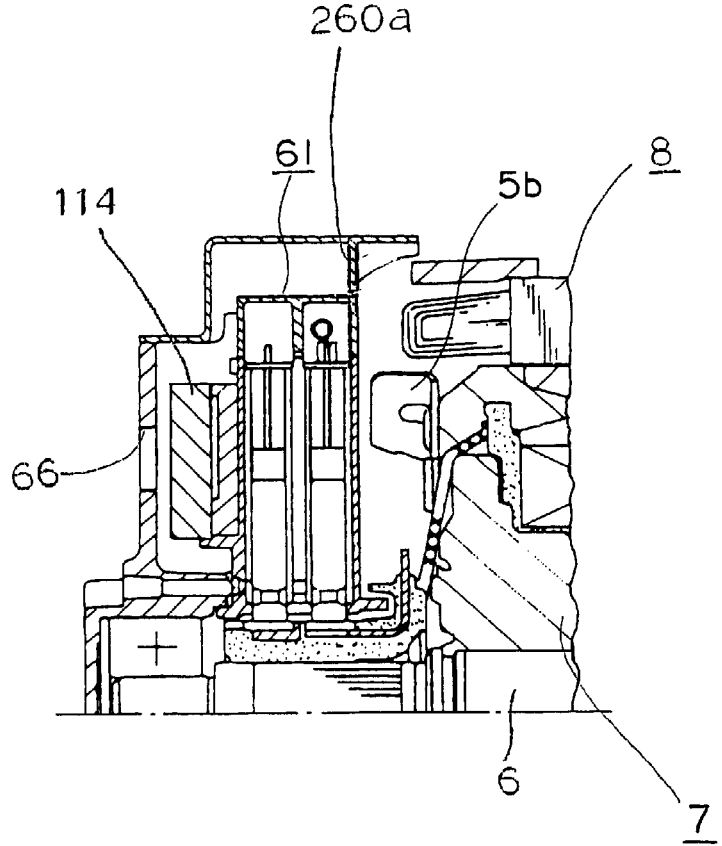
FIG. 13 is a cross section of part of an automotive alternator used a variation of the cap of Embodiment 3.
Figure 14:
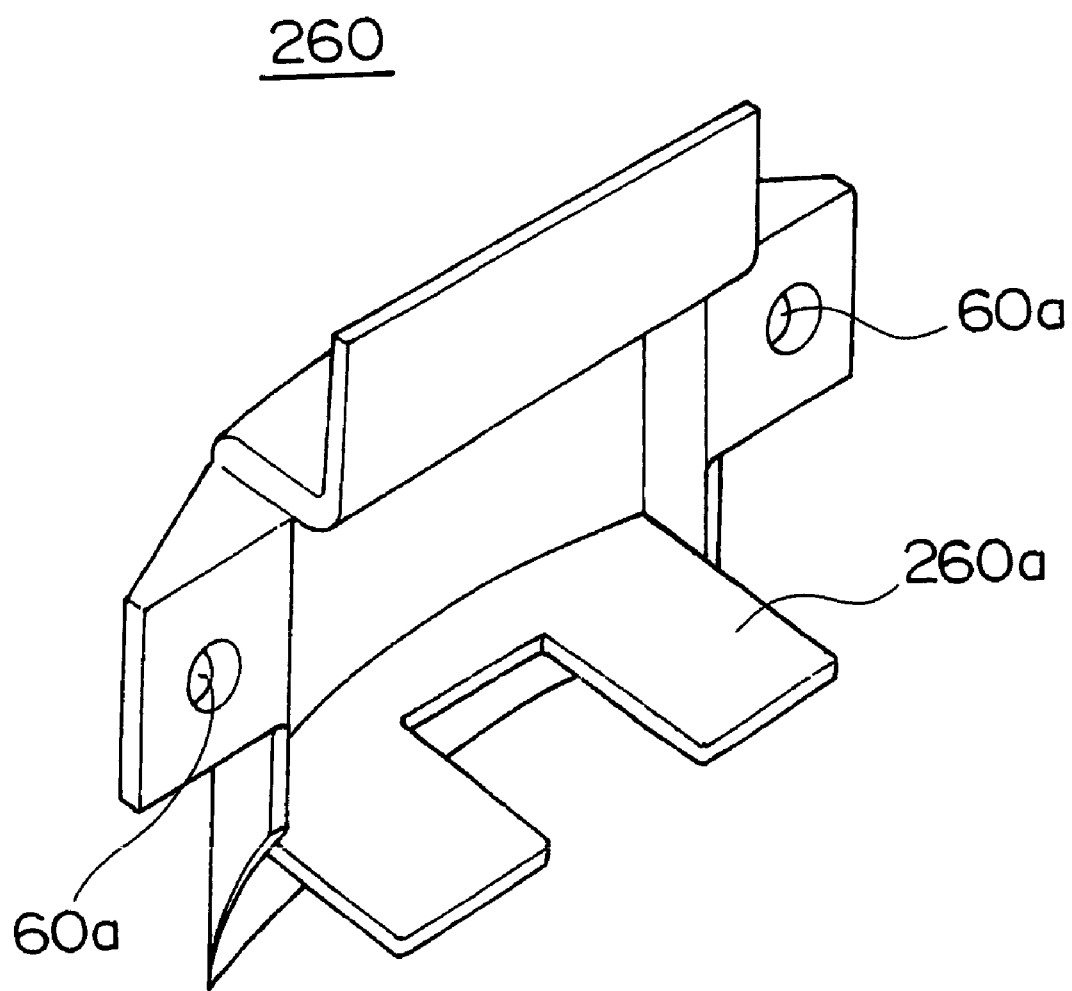
FIG. 14 is a perspective of a cap in FIG. 13.

Further, in the automotive alternator of Embodiment 3, the cap 160 in which the partition wall 160a is provided outside of the cooling plate 114 is used, a cap 260 shown in FIG. 14 in which a partition wall 260a is provided between the fan 5b and the brush holding assembly 61 as shown in FIG. 13 may be used.

Embodiment 4

Figure 15:
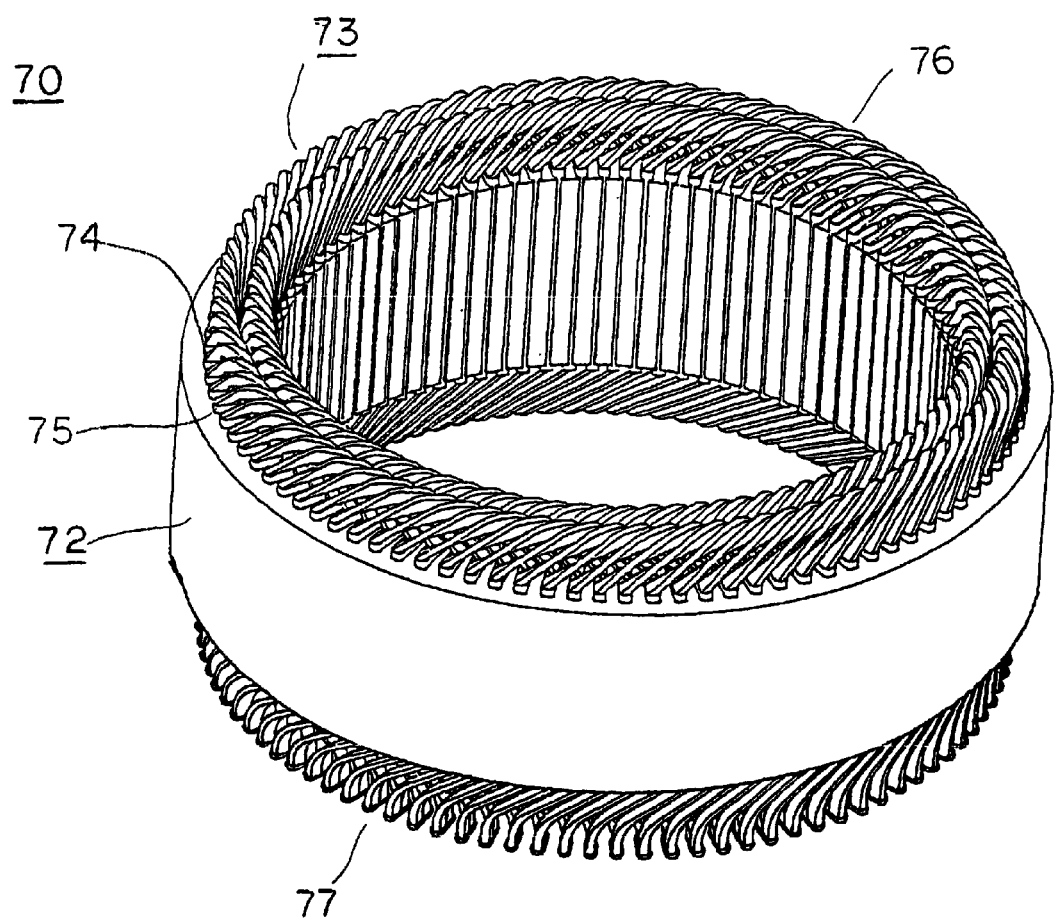
FIG. 15 is a perspective of a stator of an automotive alternator according to Embodiment 4 of the present invention.
Figure 16:
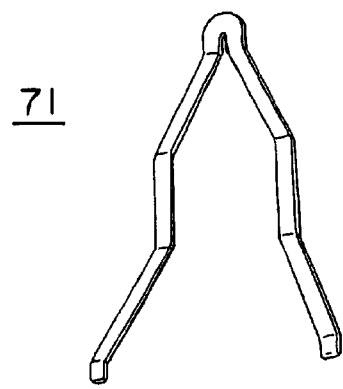
FIG. 16 is a perspective showing a conductor segment used in a stator winding of the stator in FIG. 15.
Figure 17:
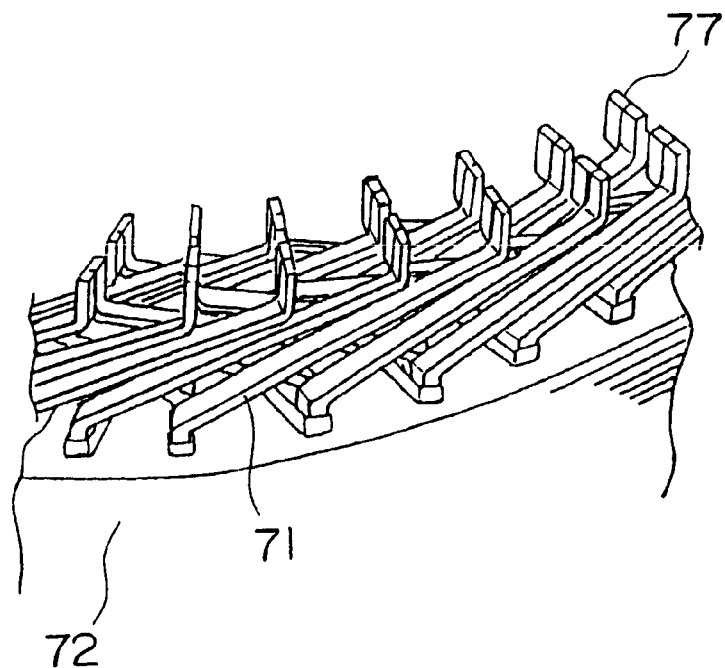
FIG. 17 is a perspective of part of the stator in FIG. 15, viewed from a front end.
Figure 18:
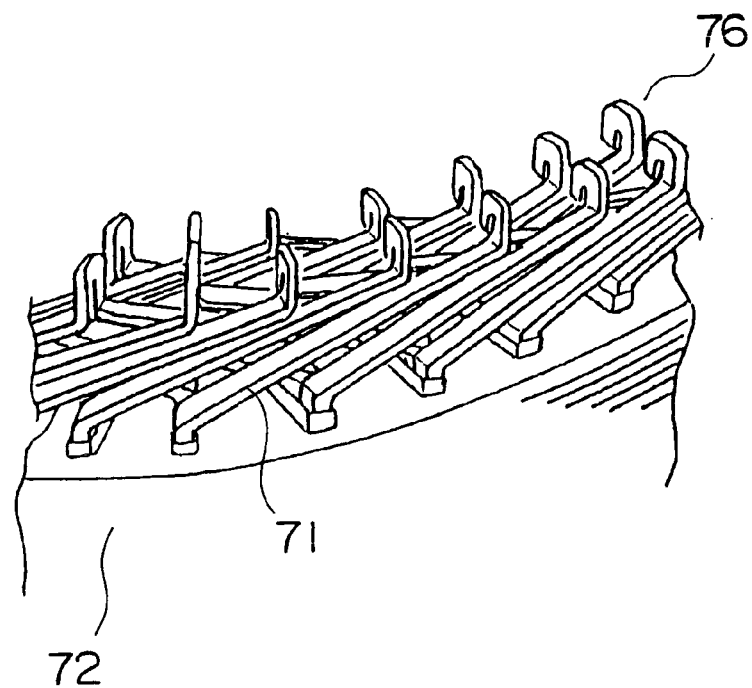
FIG. 18 is a perspective of part of the stator in FIG. 15, viewed from a rear end.

FIG. 15 is a perspective of a stator 70 of an automotive alternator according to Embodiment 4 of the present invention, FIG. 16 is a perspective showing a conductor segment 71 used in a stator winding 73 of the stator 70 in FIG. 15, and FIGS. 17 and 18 are perspectives of part of the stator 70 in FIG. 15 viewed from a front end and a rear end, respectively.

In Embodiment 4, the stator 70 includes: a stator core 72; the stator winding 73 wound on the stator core 72; and an electrically-insulating member 75 for electrically insulating the stator winding 73 from the stator core 72, the electrically-insulating member 75 being mounted in a plurality of slots 74 disposed in the stator core 72. The stator core 72 is a cylindrical laminated core laminated by building up a thin steel plate which is a plate-shaped magnetic member, and the plurality of slots 74 extend axially and are disposed at a predetermined pitch in a circumferential direction so as to open towards an inner circumferential side of the stator core 72. The stator winding 73 is constructed by joining a large number of short conductor segments 71 in a predetermined winding pattern. More specifically, the stator winding 73 is constructed by forming the short conductor segments 71 into a general U shape, inserting end portions thereof into the slots 74 of the stator core 72 from a rear end, and joining together the end portions which extend outwards at a front end.

Except for the construction of the above stator 70, the automotive alternator according to Embodiment 4 has a similar construction to that of the automotive alternator according to Embodiment 3.

In Embodiment 4, the plurality of conductor segments 71, which are conducting wires, are arranged neatly around the stator core 72, and air gaps are formed between adjacent pairs of the conductor segments 71 in rear-end coil ends 76 and front-end coil ends 77 of the stator winding 73. For that reason, when air which has entered the case 33 through the ventilation aperture 66 passes through the coil ends 76 and 77 and is expelled outside the case 33, ventilation resistance is small in the coil ends 76 and 77 on a discharge side and the air flows relatively smoothly within the case 33, improving cooling of the brushes 10 and the regulator 13, which are on an intake side.

Figure 19:
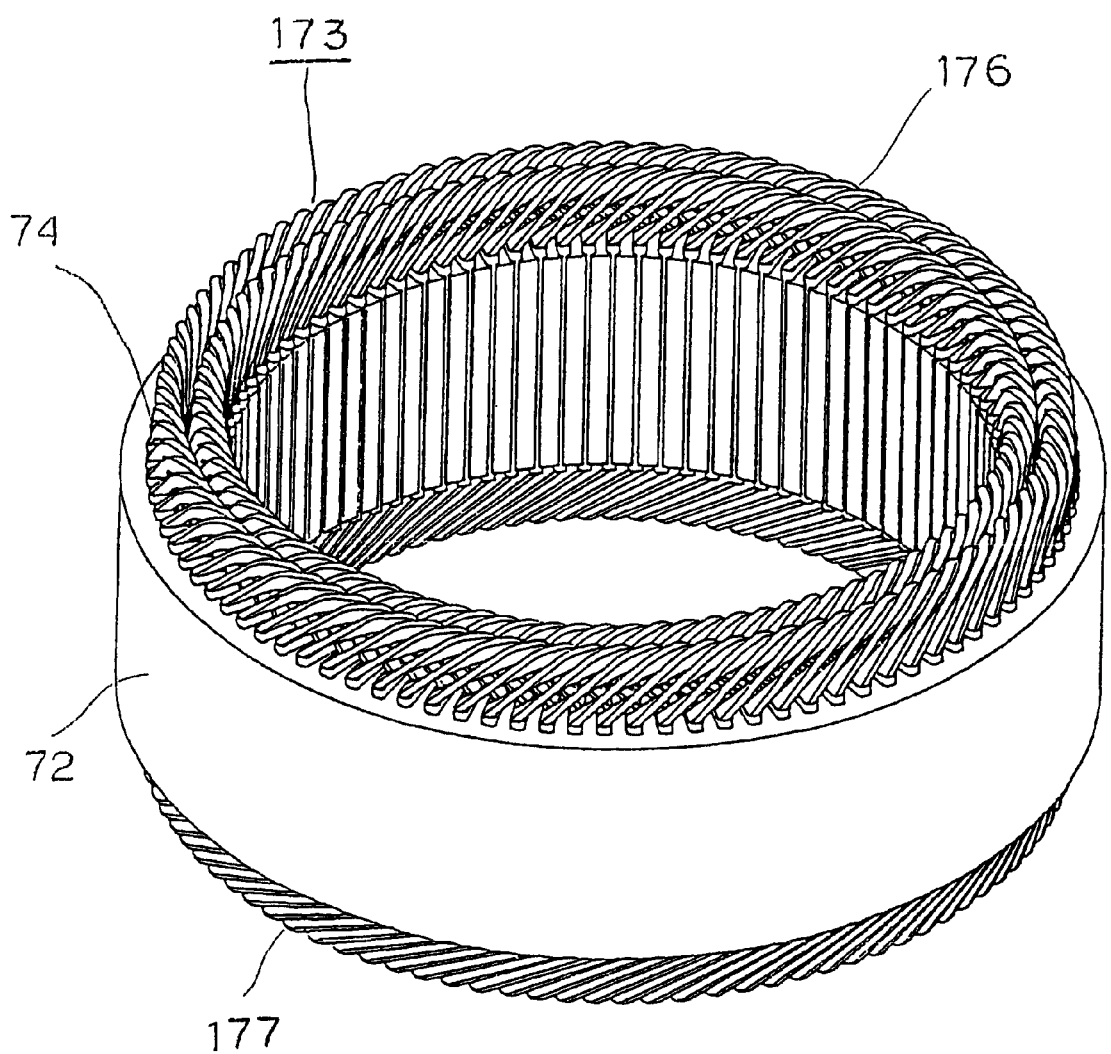
FIG. 19 is a perspective of a variation of the stator in FIG. 15.
Figure 20:
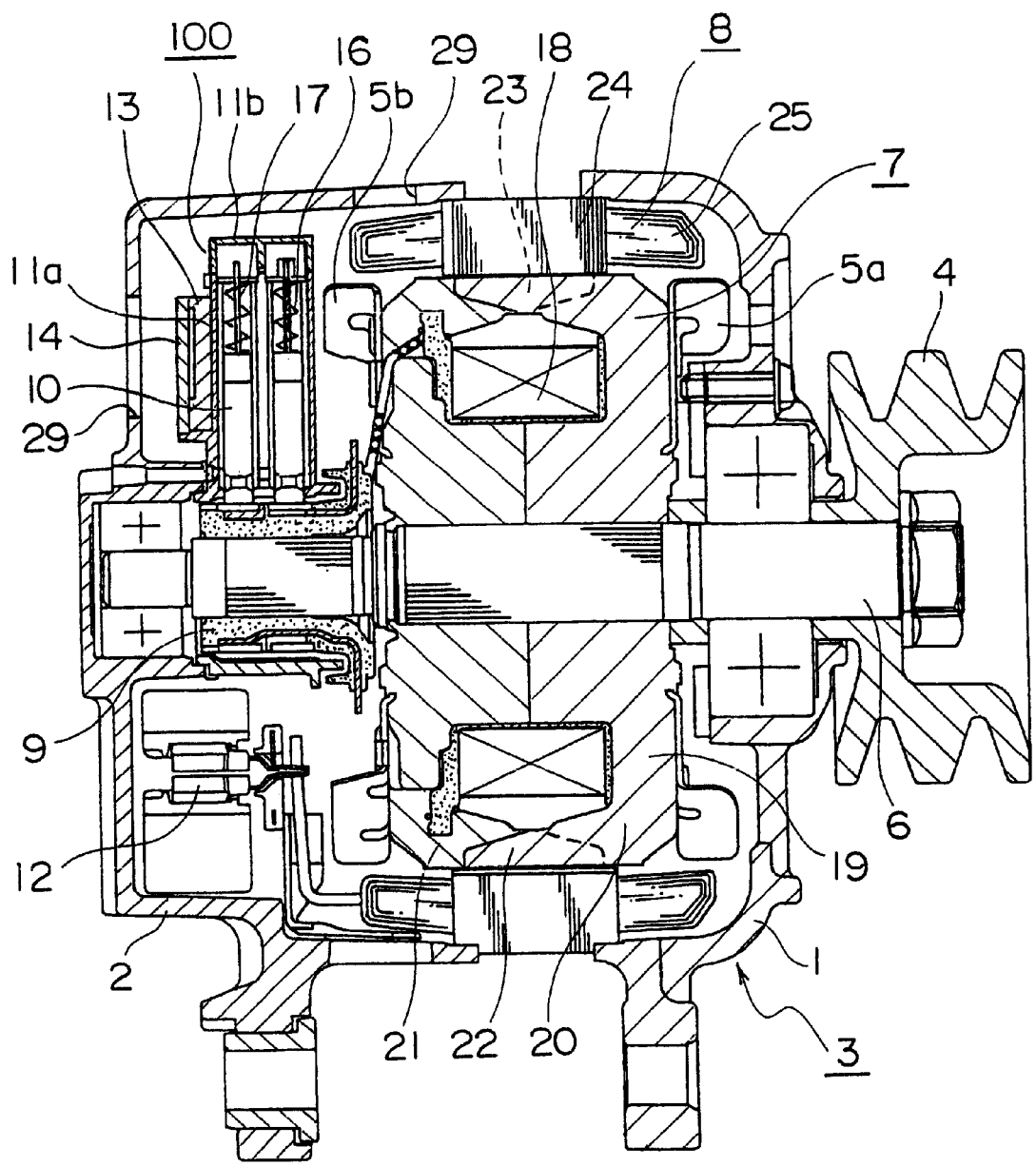
FIG. 20 is a cross section of a conventional automotive alternator.
Figure 21:
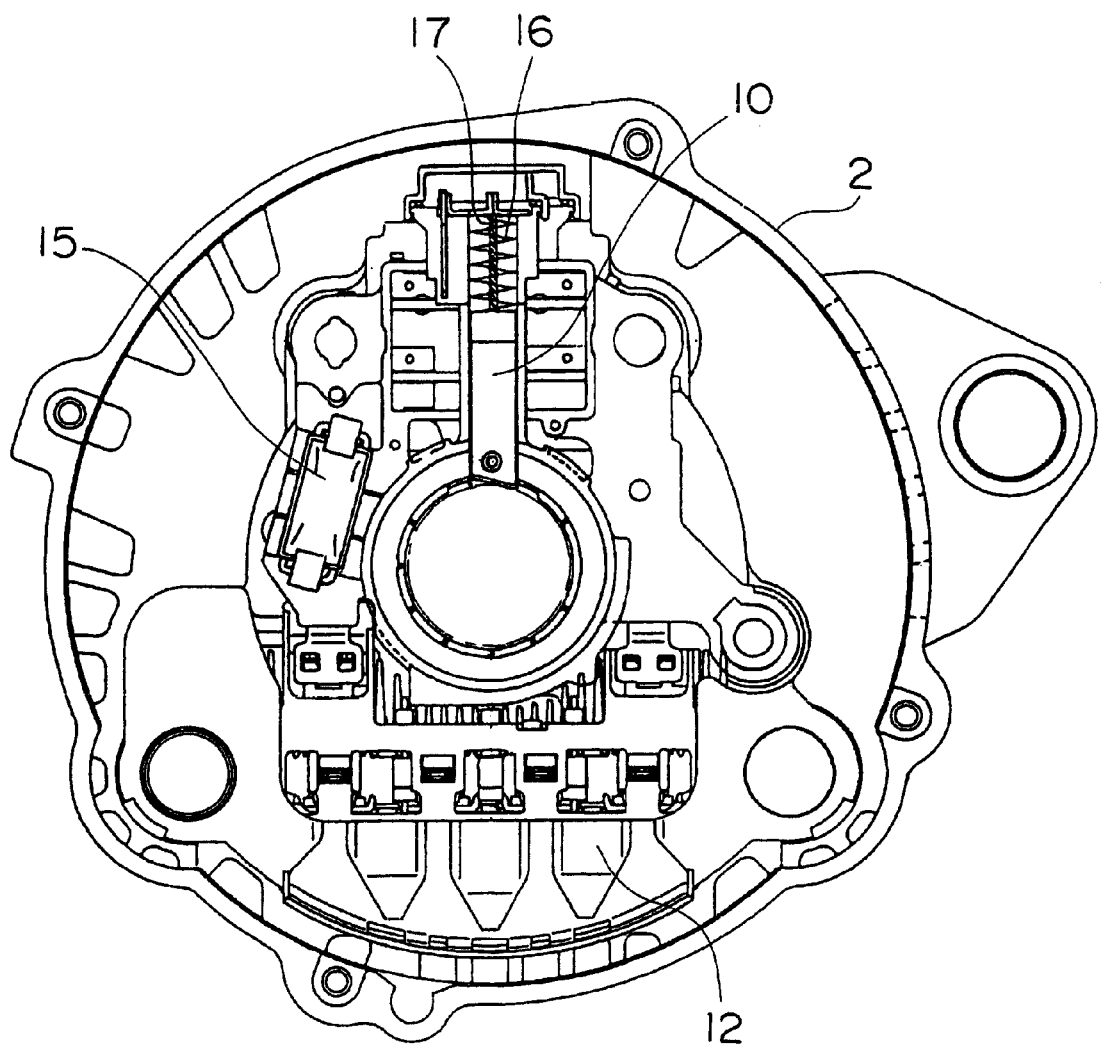
FIG. 21 is a view of the automotive alternator in FIG. 20 from a rear bracket end.
Figure 22:
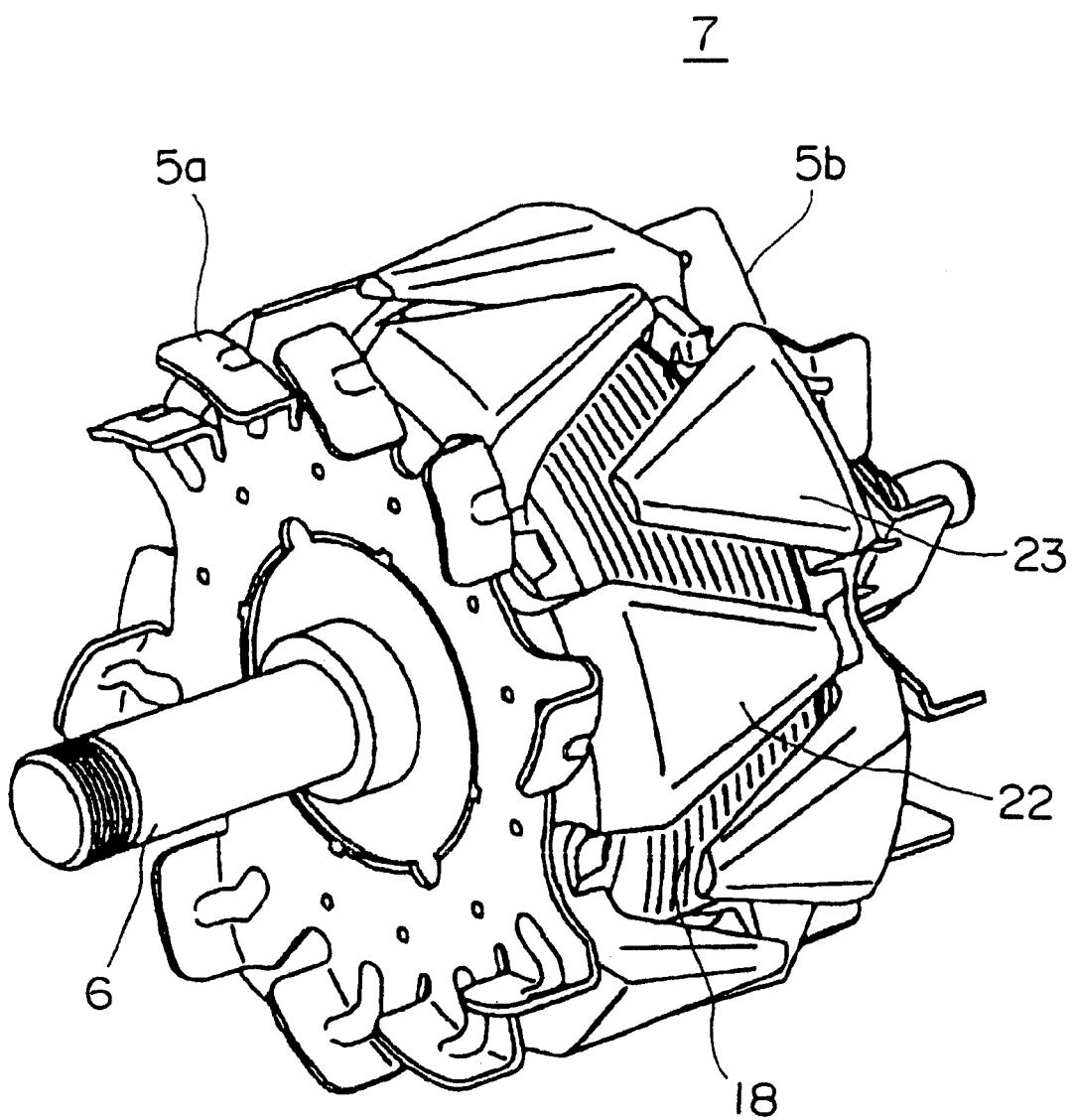
FIG. 22 is a perspective of a rotor in FIG. 20.
Figure 23:
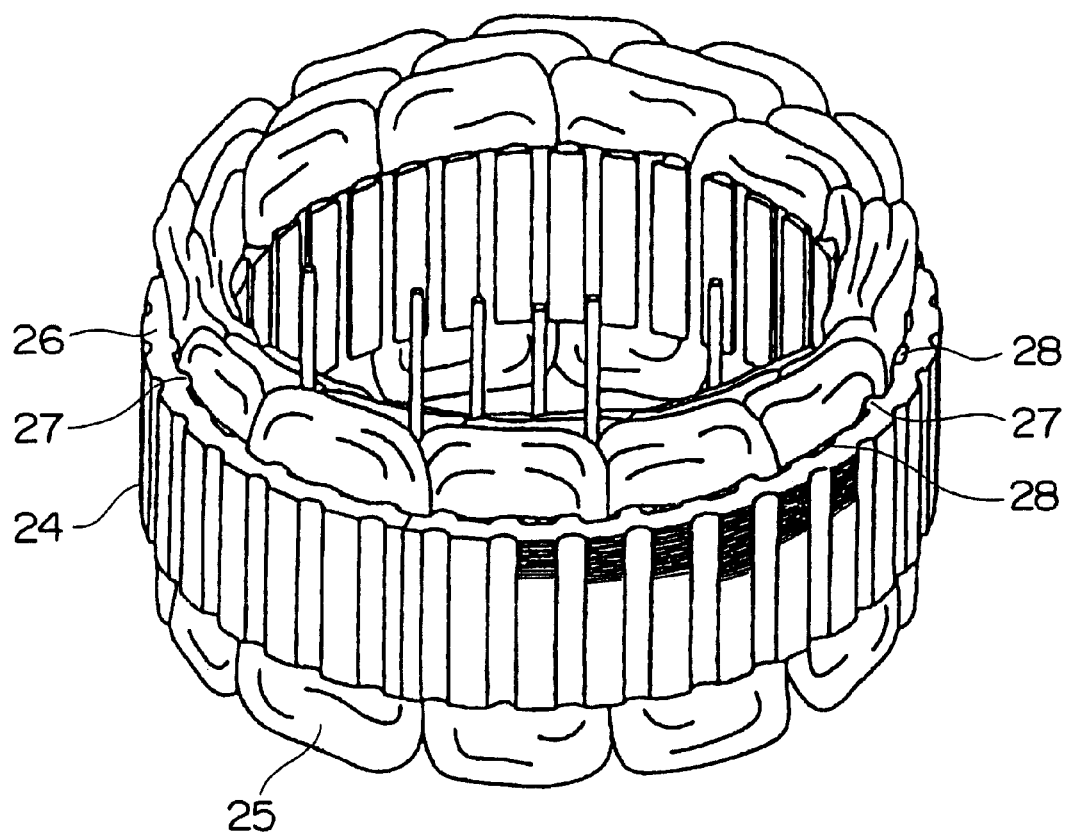
FIG. 23 is a perspective of a stator in FIG. 20.

Moreover, as shown in FIG. 19, the automotive alternator may also have a stator winding 173 which is wound by folding back continuous conducting wires outside the slots 74 at end surfaces of the stator core 72 so as to alternately occupy an inner layer and an outer layer in a slot depth direction within the slots 74 at intervals of a predetermined number of slots. In that case also, the continuous conducting wires extend outwards in an axial direction from the end surfaces of the stator core 72 and are formed into a uniform shape in a circumferential direction in rear-end and front-end coil ends 176 and 177 of the stator winding 173.

In this alternator, unlike the alternator which has joint portions joining together the end portions of the conductor segments 71 at the front end, there are no joint portions even in the front-end coil ends 177, thereby further reducing the ventilation resistance in the front-end coil ends 177 and further improving the cooling of the brushes 10 and the regulator 13, which are on the intake side.

Moreover, each of the above embodiments has been explained with reference to an automotive alternator in which two brushes 10 are housed in the brush holding assembly, but the present invention can also be applied to automotive alternators having four brushes, for example.

As explained above, according to one aspect of the present invention, there is provided an alternator including: a case; a shaft passing through the case; a rotor secured to the shaft, the rotor including a rotor coil for generating a magnetic flux on passage of an electric current therethrough, and a plurality of claw-shaped magnetic poles extending in an axial direction and covering said rotor coil, the claw-shaped magnetic poles being magnetized into North-seeking (N) and South-seeking (S) poles by the magnetic flux; a stator including a stator core provided with a plurality of slots formed so as to extend axially and be spaced circumferentially, and a stator winding mounted to the stator core; a slip rings secured to the shaft; brushes the end of which slide on the slip rings, supplying electric current to the rotor coil through the slip rings from an electric power supply; a brush holding assembly which the shaft pass through, the brush holding assembly holding the brush within a holding portion and provided with a cover capable of being opened to remove the brushes; and a cap for closing an open portion for removal and insertion of the brush, the open portion being formed at a position on the case facing the cover. Therefore, removal and insertion of the brushes is performed by passing the brushes through the open portion with the cap opened, replacement of the brushes is performed simply, and there is no necessity to go to the trouble of disassembling the alternator. Further, foreign matter, water, etc. are prevented from entering the case.

The brush holding assembly may extend to a vicinity of the open portion, enabling a longitudinal dimension of the brushes to be lengthened proportionately and also enabling the brushes to be used over a long period without replacement. Furthermore, because clearance between the case and the brush holding assembly is small, air which has entered the case takes a circuitous route, for example flowing toward the brushes and the regulator secured to the brush holding assembly, improving cooling of the regulator and the brushes.

The regulator for adjusting the magnitude of an alternating voltage generated in the stator and a cooling plate placed in contact with the regulator may be disposed on the brush holding assembly so as to overlap each other on the non-rotor side of the brush holding assembly, enabling the construction to be compact and cooling of the regulator to be improved. Furthermore, since the brush holding assembly is capable of being mounted to the case, after the regulator has been secured to the brush holding assembly, the brush holding assembly is mounted so as not to be obstructed by the regulator when mounting the brush holding assembly to the case.

The cooling plate may be provided with plural cooling fins extending in a radial direction of the rotor, enabling the area that the cooling air contacts and the cooling plate to increase, and the cooling air to flow more smoothly in the radial direction, thereby further improving cooling efficiency of the regulator.

A partition wall for making cooling air passing through the cooling plate take a circuitous route toward the brushes may be provided, enabling the contact of the cooling air and the brushes to increase, thereby further improving cooling efficiency of the brushes.

The partition wall may also be formed so as to be integral with the cap, enabling the partition wall to be simultaneously formed simply as resin molding of the cap.

A cooling fan to generate forced convection in the case may be provided between the rotor and the brush holding assembly, enabling air in the vicinity of the brush holding assembly to flow smoothly, thereby improving cooling efficiency of the brush.

A conducting wire of the stator winding may extend outwards in an axial direction from an end surface of the stator core and be formed into coil ends having a uniform shape in a circumferential direction, whereby, when air which has entered the case passes through the coil ends and is expelled outside the case, ventilation resistance is small in the coil ends on a discharge side and the air flows relatively smoothly within the case, improving cooling of the brushes and the regulator, which are on the intake side.

What is claimed is:

1. An alternator comprising:

a case with a ventilation opening;

a shaft passing through said case;

a rotor secured to said shaft, said rotor including a rotor coil for generating a magnetic flux on passage of an electric current therethrough, and a plurality of claw-shaped magnetic poles extending in an axial direction and radially surrounding said rotor coil, said claw-shaped magnetic poles being magnetized into North and South poles by said magnetic flux;

a stator including a stator core provided with a plurality of slots formed so as to extend axially and be spaced circumferentially, and a stator winding mounted to said stator core;

slip rings secured to said shaft;

brushes, the ends of which slide on the slip rings, supplying electric current to said rotor coil through said slip rings from an electric power supply;

a brush holding assembly, said brush holding assembly holding said bushes within a holding portion and provided with a cover capable of being opened to remove said brushes; and a cap for closing an open portion of said case for removal and insertion of said brushes, said open portion being formed at a position on said case facing said cover, one of said cap and said case including means for obstructing an air passage between said ventilation opening and said open portion to prevent an airflow from passing through said ventilation opening and directly through said open portion.

2. The alternator according to claim 1 wherein said brush holding assembly extends to a vicinity of said open portion.

3. The alternator according to claim 1 wherein a regulator for adjusting the magnitude of an alternating voltage generated in said stator, and a cooling plate placed in contact with said regulator, arc disposed on said brush holding assembly.

4. The alternator according to claim 3 wherein said cooling plate is provided with plural cooling fins extending in a radial direction of said rotor.

5. The alternator according to claim 3 wherein said means is a partition wall for making the airflow passing through said cooling plate take a circuitous route toward said brushes.

6. The alternator according to claim 5 wherein said partition wall is formed so as to be integral with said cap.

7. The alternator according to claim 1 wherein a cooling fan to generate forced convection in said case is provided between said rotor and said brush holding assembly.

8. The alternator according to claim 1 wherein conductors of said stator winding extend outwardly in an axial direction from an end surface of said stator core and are fanned into coil ends having a uniform shape in a circumferential direction.

9. An alternator comprising:

a case;

a shaft passing through said case;

a rotor secured to said shaft, said rotor including a rotor coil for generating a magnetic flux on passage of an electric current therethrough, and a plurality of claw-shaped magnetic poles extending in an axial direction and covering said rotor coil, said claw-shaped magnetic poles being magnetized into North-seeking (N) and South-seeking poles by said magnetic flux;

a stator including a stator core provided with a plurality of slots formed so as to extend axially and be spaced circumfereinially, and a stator winding mounted to said stator core;

slip rings secured to said shaft;

brushes the ends of which slide on the slip rings supplying electric current to said rotor coil through said slip rings from an electric power supply;

a brush holding assembly which said shaft passes through, said brush holding assembly holding said brushes within a holding portion and provided with a cover capable of being opened to remove said brushes, said cover covering a connection portion connecting holding assembly terminals of said brush holding assembly and brush terminals; and a cap for closing an open portion for removal and insertion of said brushes, said open portion being formed at a position on said case facing said cover.

* * * * *